United States Patent
Duo (10) Patent No.: US 11,540,132 B2
(45) Date of Patent: *Dec. 27, 2022

(54) METHOD FOR PROVIDING AN ELASTIC CONTENT FILTERING SECURITY SERVICE IN A MESH NETWORK

(71) Applicant: SonicWALL Inc., Milpitas, CA (US)

(72) Inventor: Zhuangzhi Duo, Fremont, CA (US)

(73) Assignee: SonicWALL Inc., Milpitas, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/111,391

(22) Filed: Dec. 3, 2020

(65) Prior Publication Data
US 2021/0176639 A1     Jun. 10, 2021

Related U.S. Application Data

(63) Continuation-in-part of application No. 16/397,951, filed on Apr. 29, 2019, now Pat. No. 11,310,665.
(Continued)

(51) Int. Cl.
*H04W 12/088* (2021.01)
*H04W 80/06* (2009.01)
(Continued)

(52) U.S. Cl.
CPC ....... *H04W 12/088* (2021.01); *H04W 12/122* (2021.01); *H04W 80/06* (2013.01); *H04W 84/18* (2013.01)

(58) Field of Classification Search
CPC .. H04W 12/088; H04W 80/06; H04W 12/122
See application file for complete search history.

(56) References Cited

U.S. PATENT DOCUMENTS

| | | | | |
|---|---|---|---|---|
| 7,711,605 | B1 * | 5/2010 | Santeufemia | G06Q 30/0603 705/26.5 |
| 8,108,933 | B2 * | 1/2012 | Mahaffey | G06F 21/577 726/25 |

(Continued)

OTHER PUBLICATIONS

U.S. Appl. No. 16/397,951 Office Action dated Apr. 29, 2021.
(Continued)

*Primary Examiner* — Viral S Lakhia
(74) *Attorney, Agent, or Firm* — Polsinelli LLP (57) ABSTRACT

The present disclosure is directed to distributing processing capabilities throughout different nodes in a wireless mesh network. Methods and apparatus consistent with the present disclosure increase the efficiency of communications in a wireless mesh network because they help minimize the need to forward communications to other nodes in the wireless mesh network such that an evaluation can be performed. Apparatus and methods consistent with the present disclosure may distribute ratings or verdicts associated with previous requests to access data to different nodes in a wireless mesh network without generating additional wireless communications through the wireless mesh network. Apparatus and methods consistent with the present disclosure distribute content ratings to different nodes in a wireless network such that different wireless nodes may block redundant requests to undesired content without increasing messaging traffic.

20 Claims, 7 Drawing Sheets

Related U.S. Application Data (60) Provisional application No. 62/943,126, filed on Dec. 3, 2019.

(51) Int. Cl.
 *H04W 12/122* (2021.01)
 *H04W 84/18* (2009.01)

(56) References Cited

U.S. PATENT DOCUMENTS

| | | | | |
|---|---|---|---|---|
| 8,620,402 B2* | 12/2013 | Parker, III | ............ | A61B 5/335 |
| | | | | 600/509 |
| 8,773,258 B2* | 7/2014 | Vosch | .................... | A61B 5/282 |
| | | | | 340/286.07 |
| 9,384,334 B2* | 7/2016 | Burba | ...................... | G06F 21/10 |
| 9,948,649 B1* | 4/2018 | Zhao | ....................... | H04L 63/20 |
| 10,111,099 B2* | 10/2018 | Hunt | ...................... | H04W 12/08 |
| 10,713,666 B2 | 7/2020 | Freishtat et al. | | |
| 10,802,760 B2* | 10/2020 | Zaretsky | ................ | G06F 3/0673 |
| 10,957,425 B1* | 3/2021 | Franks | ................... | G16H 10/60 |
| 11,062,048 B1* | 7/2021 | Durham | .............. | G06F 16/9535 |
| 2013/0191904 A1* | 7/2013 | Piliouras | ............ | G06Q 30/0269 |
| | | | | 726/7 |
| 2014/0279623 A1 | 9/2014 | Mislove et al. | | |
| 2014/0280761 A1* | 9/2014 | Rothschild | .............. | H04L 67/02 |
| | | | | 709/219 |
| 2015/0188964 A1 | 7/2015 | Sharma et al. | | |
| 2015/0324555 A1‡ | 11/2015 | Burba | ..................... | H04W 4/08 |
| | | | | 726/27 |
| 2016/0028798 A1* | 1/2016 | Agrawal | ............. | H04L 67/1057 |
| | | | | 707/751 |
| 2019/0082224 A1* | 3/2019 | Bradley | ............. | G06Q 30/0282 |
| 2020/0097666 A1* | 3/2020 | Weldemariam | ..... | G06F 21/6218 |
| 2020/0344610 A1 | 10/2020 | Duo | | |
| 2020/0359349 A1 | 11/2020 | Duo et al. | | |
| 2021/0160962 A1 | 5/2021 | Duo | | |

OTHER PUBLICATIONS

U.S. Appl. No. 17/111,388, Method for Providing an Elastic Content Filtering Security Service in a Mesh Network, filed Dec. 2, 2020.

\* cited by examiner
‡ imported from a related application

METHOD FOR PROVIDING AN ELASTIC CONTENT FILTERING SECURITY SERVICE IN A MESH NETWORK

CROSS-REFERENCE TO RELATED APPLICATIONS

The present application is a continuation in part and claims priority benefit of U.S. patent application Ser. No. 16/397,951, filed Apr. 29, 2019, and claims priority benefit of U.S. provisional application No. 62/943,126, filed Dec. 3, 2019, the disclosures of which are incorporated herein by reference.

BACKGROUND OF THE INVENTION

Field of Invention

The present disclosure generally relates to increasing the efficiency of a wireless mesh network. More specifically, the present disclosure relates to different mesh nodes in a wireless mesh network collaboratively protecting computing devices that are part of the wireless mesh network.

Description of the Related Art

Every day the use of wireless networks is expanding. Wireless mesh networks commonly use communications consistent with one of the 802.11 wireless communication standards that are commonly referred to as "Wi-Fi." Because of this, 802.11 communication channels are a preferred type of communication channel used in wireless mesh networks.

Wireless mesh networks typically include various mesh devices commonly characterized as access points or wireless nodes. In certain instances, devices known as wireless portals may implement the security filtering functionality of a firewall. In other instances, wireless portals may not be configured to perform a security filtering function. In either case, these portals also commonly communicate wirelessly with one or more wireless access points. Wireless access points may perform functions consistent with a portal (or wireless mesh portal) that receives 802.11 communications from a plurality of wireless mesh points. Wireless mesh portals also communicate with other devices over another type of communication network, where wireless mesh points typically only communicate with other devices using only one type of communication network. In such a network, wireless mesh points may communicate with other mesh points and with computers using only 802.11 communications. Wireless access points may also perform the functionality of a wireless mesh point that may only communicate with other devices using 802.11 wireless communications. As such, both mesh points and mesh portals are both commonly referred to as "mesh devices" or "wireless access points" that include different functionality.

In a wireless mesh network, typically all wireless communication traffic is passed through a few (one or more) wireless mesh portals and many wireless mesh points. In certain instances, this can lead to an imbalance in a wireless network. For example, in instances where wireless mesh portals perform functions consistent with a firewall, more resources of the relatively few portal devices may be dedicated to security functions. This can cause the mesh portals to spend less than an optimal amount of resources performing their primary function of keeping communications flowing through the wireless network. This can occur when processors at these portals are not powerful enough to keep up with both communication traffic and security function processing. This imbalance can lead to wireless portals becoming a performance bottleneck that slows the flow of communication data through the network. What are needed are new forms of computer network security methods and apparatus that protect wireless networks in manageable ways that do not slow communications in the wireless network. Alternatively, when wireless mesh portals perform little or no wireless security functions, they may make a wireless mesh network vulnerable to hacking or they may cause the wireless portal to rely on a gateway or firewall to provide security filtering. In either instance, filtering functions consistent with preventing computing devices receiving information from accessing undesired content are not distributed throughout a wireless mesh network.

Since current wireless mesh networks do not distribute content filtering functions to different devices in a wireless mesh network, a single mesh point or portal may receive and pass on redundant requests for prohibited content. This can lead reduced efficiency of a wireless mesh network because redundant requests to undesired content may be passed through different wireless mesh nodes in a manner that consumes precious bandwidth. As such, what are needed are methods that allow different mesh nodes to store information relating to a security function or a filtering in a way that distributes security workloads through different devices that may include both mesh portals and mesh points in a wireless mesh network.

SUMMARY OF THE CLAIMED INVENTION

The presently claimed invention relates to a method, a non-transitory computer readable storage medium, and an apparatus that my execute functions consistent with the present disclosure. Methods and apparatus consistent with the present disclosure may allow or may block access to digital content based on test results associated with one or more evaluations. A method consistent with the present disclosure includes a wireless mesh node that may be part of a wireless mesh network. The presently claimed method may receive a request to access content, may compare information associated with the request to information stored in a local cache memory, and may send the information associated with the request to a first computing device for additional evaluations. The first computing device may receive the request associated information and may compare that information with stored data when identifying if the request is a request for bad content. The first computing device may then send a test result that is received at the wireless mesh node. After the wireless mesh node receives the test result, the wireless mesh node may perform an action that either allows the requested content to be sent to a requesting computer, blocks at least a portion of the requested content from being sent to the requesting computer, or that sends data regarding the access request to a security computer based on the test result. The actions performed by the wireless mesh network may be controlled by or be performed by a processor that executes instructions out of a memory.

When the presently claimed invention is performed by a non-transitory computer readable storage medium, a processor at a wireless mesh node may implement the presently claimed method. Here again the method may receive a request to access content, may compare information associated with the request to information stored in a local cache memory, and that may send the information associated with the request to a first computing device for additional evaluations. The first computing device may receive the request associated information and may compare that information with stored data when identifying if the request is a request for bad content. The first computing device may then send a test result that is evaluated by the processor. After the processor evaluates the test result, the processor may initiate an action that either allows the requested content to be sent to a requesting computer, blocks at least a portion of the requested content from being sent to the requesting computer, or that sends data regarding the access request to a security computer based on the test result.

An apparatus consistent with the present disclosure may include a wireless data communication interface that receives a request to access content stored at a computer. The presently claimed apparatus may include a memory, a cache memory, and a processor that executes instructions out of the memory. The processor may execute instructions to compare information associated with the content request with information stored in the cache memory, and may prepare the request associated information for transmission to another computer. Once prepared for transmission the request associated information may be sent to the other computer that may compare the request associated information with stored information and that may provide a test result that may be received by the processor. The processor may then initiate an action that either allows the requested content to be sent to a requesting computer, block at least a portion of the requested content from being sent to the requesting computer, or send data regarding the access request to a security computer based on a test result.

DETAILED DESCRIPTION

The present disclosure is directed to distributing processing capabilities throughout different nodes in a wireless mesh network. Methods and apparatus consistent with the present disclosure increase the efficiency of communications in a wireless mesh network because they help minimize the need to forward communications to other nodes in the wireless mesh network such that an evaluation can be performed. Apparatus and methods consistent with the present disclosure may distribute ratings or verdicts associated with previous requests to access data to different nodes in a wireless mesh network without generating additional wireless communications through the wireless mesh network. Apparatus and methods consistent with the present disclosure distribute content ratings to different nodes in a wireless network such that different wireless nodes may block redundant requests to undesired content without increasing messaging traffic.

Methods consistent with the present disclosure may identify a rating associated with digital data that was requested from a computer. For example, a computer may send a request when a user of that computer wishes to view content provided by a website. That request may be passed through one or more mesh nodes and methods consistent with the present disclosure may identify that the requested website or data located at the requested website is associated with either a good or a bad content rating. After the content rating has been identified, a response message may be sent back to the requesting computer via the one or more mesh nodes that originally passed the website access request. As these response messages are passed back to the requesting computer, each of the respective mesh nodes that pass the response message may store the rating of the website in a respective cache memory. The data stored in the caches of each of these mesh nodes may include information that cross-reference data identifiers with bad or good content ratings. These data identifiers may identify a data source using a universal record locator (URL), a domain name, a file name, or other information that identifies a data set or computer associated with a request. Data identifiers may be used to generate a signature that uniquely identifies a data content source or digital content. After a content rating is associated with a particular website, each of the mesh nodes that received the response message associated with the website request can identify the rating of that website without communicating with another wireless mesh node. In an instance where a subsequent request is received from the requesting computer or another requesting computer to access that same website, a mesh node that received that subsequent request may identify the rating of the web site by accessing its own local cache memory. This process allows each mesh node of a plurality of mesh nodes to block subsequent access requests to websites that are assigned a bad reputation or to allow access requests based on a good reputation.

Figure 1:
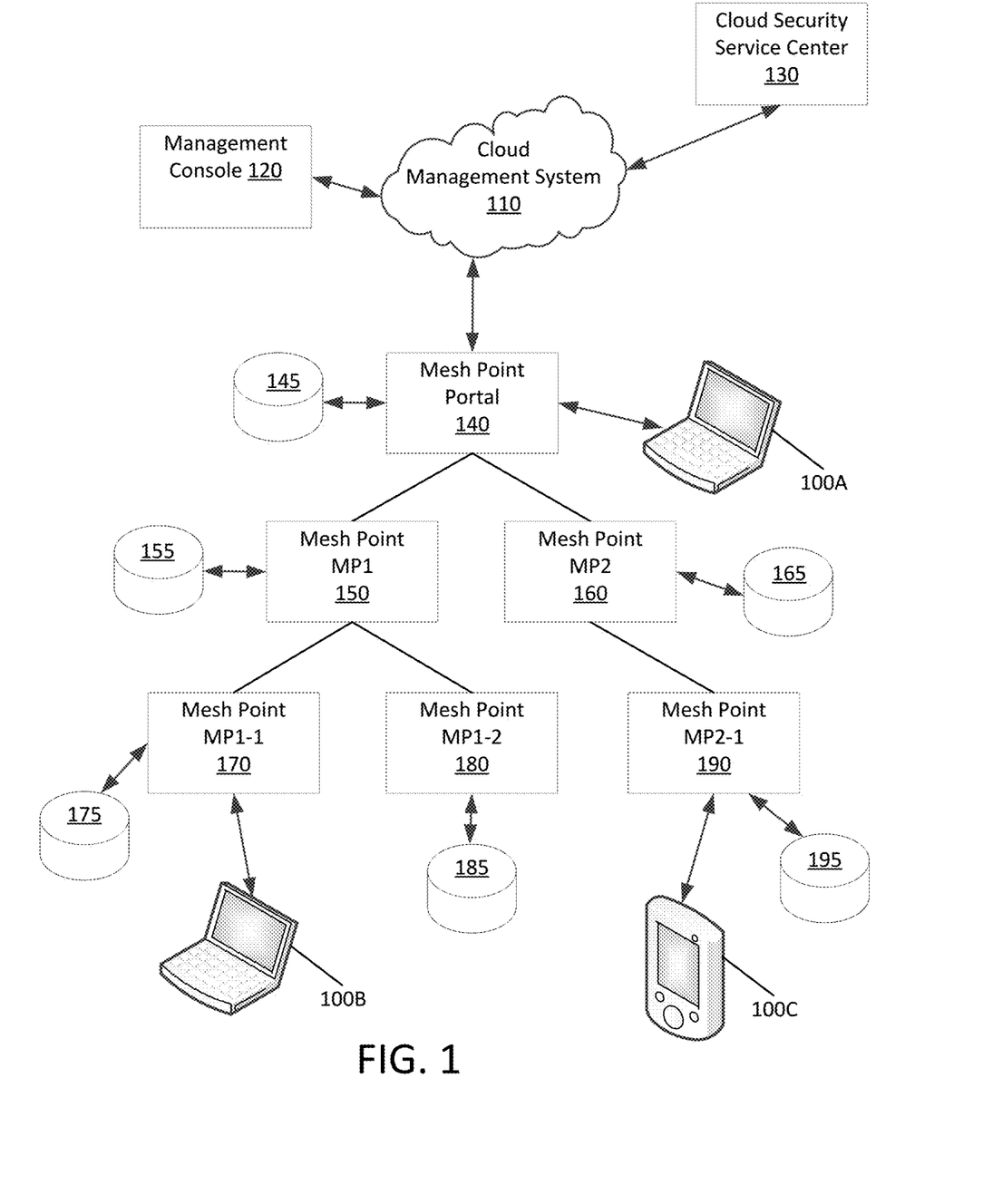
FIG. 1 illustrates elements of a wireless mesh network that communicates with a cloud management system.

FIG. 1 illustrates elements of a wireless mesh network that communicates with a cloud management system. FIG. 1 includes cloud management system 110, management console 120, cloud security center 130, mesh portal 140, mesh points (150, 160, 170, 180, & 190), mesh caches (145, 155, 165, 175, 185, & 190), and various computing devices (100A, 100B, & 100C). Communications between computing devices wireless devices 100A-100C may be configured to be transmitted wirelessly with any of the mesh points (150, 160, 170, 180, or 190) or with mesh portal 140 of FIG. 1. Mesh portal 140 may store data in mesh cache 145, mesh point 150 may store data in mesh cash 155, mesh point 160 may store data in mesh cash 165, mesh point 170 may store data in mesh cash 175, mesh point 180 may store data in mesh cash 185, and mesh point 190 may store data in mesh cash 195. Management console 120 may be a computing device or a user interface that allows administrators to set configurations or requirements of mesh networks.

Note that mesh points 150 and 160 are also referred to respectively as MP1 and MP2 this notation including a single number following a mesh point designator of "MP" indicates that mesh nodes 150 and 160 are located one wireless hop from mesh point portal 140. Note also that Mesh points 170, 180, and 190 are each located two hops from mesh point portal 140. These mesh points are also referred to respectively as MP1-1, MP1-2, and MP2-1. Here the two numbers following the "MP" designator indicate that that mesh points must pass through two hops. The MP1-1 designation in FIG. 1 indicates that mesh point 170 is a first mesh point that is two hops from mesh point portal 140, where one of those hops includes mesh point MP1 150. The MP1-2 designation indicates that mesh point 180 is a second mesh point that is two hops from mesh portal 140, where one of those hops includes mesh point MP1 150. The MP2-1 designation in FIG. 1 indicates that mesh point 190 is a first mesh point that is two hops from mesh point portal 140, where one of those hops includes mesh point MP2 160.

FIG. 1 illustrates computing device 100A communicating with mesh point portal 140, computing device 100B communicating with mesh point 170, and computing device communicating with mesh point 190. Note that communications from computing device 100A are passed directly to mesh point portal without having to pass through another wireless mesh device. Communications from computing device 100B and 100C each have to pass through two mesh points before reaching mesh point portal 140 (a total of 3 hops that include device to a first mesh point—first mesh point to a second mesh point—and second mesh point to a mesh portal).

Whenever a particular mesh point receives a request to access a website or data stored at the internet, that request may be passed through other mesh points, and through a mesh portal, such as mesh portal 140 of FIG. 1. Mesh portal 140 may then pass the request via cloud management system 110 to cloud security service 130 that may perform an analysis related to the requested website or internet data. Cloud security service 130 may perform any number of security checks on the web site or received data. For example, cloud security service 130 may look up a reputation of a web site to see if that website has been assigned a bad reputation. Alternatively or additionally, cloud security service may perform other tests, such as a deep packet inspection (DPI) scan that looks for virus/malware patterns or run time code analysis that checks to see if requested data performs a nefarious act.

After a result is received from the cloud security service center 130, the result may be passed through each respective mesh node (mesh point portal or mesh point) until that result is passed back to the computing device that requested access to the website or internet data. As the result is passed through each respective mesh node, the result may be stored in a cache associated with each individual mesh node that the result message passed through. For example, mesh point portal 140 may store a received result in cache 145, mesh point 150 may store the result in cache 155, and mesh point 170 may store the result in cache 175 without increasing an amount of network traffic.

The information stored in the caches of FIG. 1 may be associated with a time-to-live time that may be set based on one or more rules received via management console 120 and may include a hash of access information (e.g. a universal record locator—URL) and a test result or verdict. This hash of information or other information associated with the results stored in a cache may then be deleted after the time-to-live time for that data has transpired. In certain instances a time-to-live time may be associated with a number of hops from a mesh portal. A greater number of hops may be associated with a lower time-to-live time value at each respective mesh point. As such a mesh portal may have a greatest time-to-live time and a mesh point located a maximum number of hops may have a lowest value of a time-to-live time for particular cache entries. In such an instance, when a redundant request is sent to a mesh point that recently purged entries in their cache may pass that request to another mesh node that still maintains information identifying a data source associated with the has been assigned a bad reputation. This could result in the mesh portal blocking the request and sending a message to the mesh point. Both the mesh portal and the mesh node may then update information stored at their respective cache memories that cross-references updated time-to-live indicators and bad reputation information. By having longer time-to-live time settings for nodes closest to a portal, the mesh portal will be less likely to send access requests to the security computer, while mesh nodes farther from the portal may be able to free cache memory to store other data. Administrators may also configure time-to-live times that cause certain parts of a network to retain cache entries longer than other parts of a network.

A particular time-to-live time may be stored in the cache memory used to cross-reference a request identifier and with a reputation. In certain instances, digital content that is considered undesirable may be assigned shorter time-to-live times than digital content that is associated with a threat. This may help limit an amount of work that is performed by a security computer. For example, the security computer may have to spend more time to identify that a particular set of requested data includes a virus than amount of time required to identify that a particular website is associated with undesired content. In this example, the security computer may have to test the requested data using a compute intensive sandboxing technique, where the identification that the particular website stores undesired data may be identified using a less compute intensive operation of parsing a list of URLs and ratings. As such, administrators may adjust time-to-live times for data stored in particular cache memories of mesh nodes according to a strategy that best fits their circumstances or preferences.

A mesh node may also store a start time associated with a particular time-to-live time such that the mesh node could more easily monitor when to delete particular entries from the cache memory. To identify when a particular entry should be deleted, all that need be done is to identify an amount of time that has transpired since an entry was stored in the cache and to see if that amount of time meets or exceeds the time-to-live time associated with that particular entry. Once the time-to-live for a particular entry has passed, that entry may be deleted from the cache.

The path along which wireless communications will pass in a wireless mesh network consistent with the present disclosure may be identified according to one or more conventions or rules associated with managing the wireless mesh network. Mesh portals may be initially configured as being a portal according to settings that may be received via management console 120 of FIG. 1. Some mesh points in a mesh network may also be capable of being promoted to assuming the responsibilities of a wireless mesh portal. Alternatively or additionally, designated mesh portals or promotable mesh points may each have the capability of communicating with other computing devices via at least two different types of wireless communication channels. For example, one communication channel may use 802.11 communications and a second channel may use a second type of wireless communication channel (e.g. a wireless cellular communication channel).

Rules associated with discovering an optimal path to send wireless data communications may cause wireless nodes to connect with other nodes based on signal strength measurements, error rate measurements, or signal to noise measurements. Alternatively these rules may be associated with initial administrator settings or a maximum number of hops to a mesh portal. Furthermore, the route that communications travel may be modified as network conditions change. For example, as relative signal strengths change, as transmission error rates change, or as signal to noise ratios change. Alternatively communication routes may be changed when devices fail or when certain nodes in the wireless network become congested. Congestion in a wireless network may be identified based on a number of user devices communicating with particular nodes increasing to or above a threshold amount number of user devices. Congestion may also be identified based on a total number of communications passed through a mesh node at particular points in time.

Figure 2:
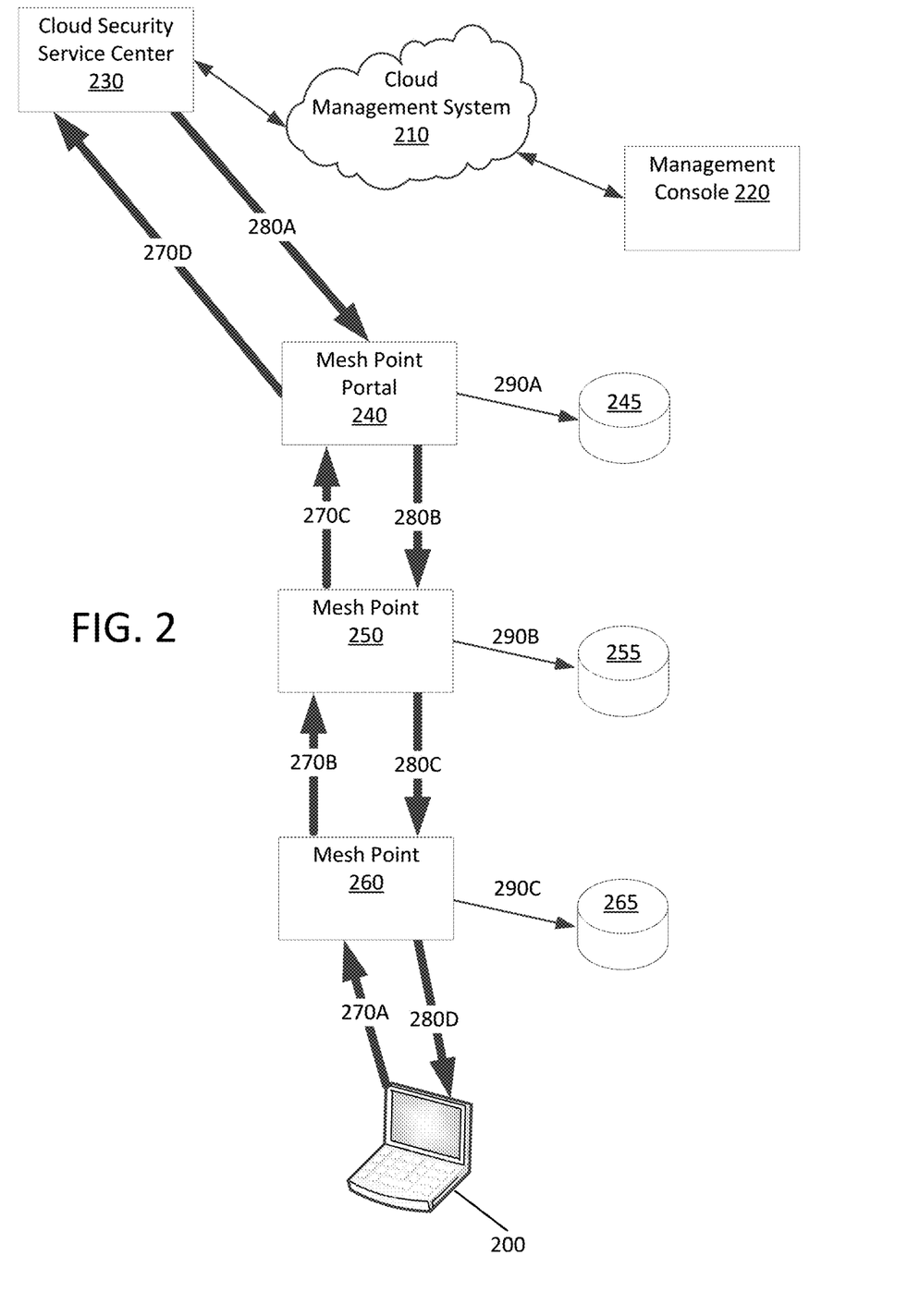
FIG. 2 illustrates communications that pass through different mesh devices and illustrates that each respective mesh device may store information in a cache memory regarding those communications.

FIG. 2 illustrates communications that pass through different mesh devices and illustrates that each respective mesh device may store information in a cache memory regarding those communications. FIG. 2 includes cloud management system 210, management console 220, cloud security service center 230, mesh point portal 240 that includes cache 245, mesh point 250 that includes cache 255, mesh point 260 that includes cache 265, and computing device 200. Requests such as request 270A may be sent to access a website from computer 200. Note that request 270A is passed through different mesh points (260 & 250) and through mesh portal 240. Note also that mesh point 260 passes the request to mesh point 250 via communication 270B, mesh point 250 passes the request to mesh portal 240 via communication 270C, and that mesh point portal 240 passes the request to cloud security service center 230 via communication 270D. As mentioned in respect to FIG. 1, cloud security service center 230 may perform a series of checks or tests when a computing device attempts to access a website or attempts to access data via the Internet. After cloud security service center 230 performs checks or tests, a result may be received at mesh portal 240, then at mesh portal 250, then at mesh portal 260 as that response travels to computing device 200.

Here a set of communications 280A, 280B, 280C, and 280D relate to a response message originating from cloud security service center 230. Communications 280A, 280B, 280C, and 280D are passed through each respective mesh node (240, 250, & 260). As each respective mesh node receives the response message, each of those mesh devices may store result information in a respective cache. As such, mesh point portal 240 may store the result in cache 245 via cache access 290A, mesh point 250 may store the result in cache 255 via cache access 290B, and mesh point 260 may store the result in cache 265 via cache access 290C. After this result information has been stored in these different caches, any of the mesh devices (240, 250, or 260) that receives a subsequent request to access the previously requested content may identify whether the subsequent access request should be allowed or blocked based on the result stored in the respective caches. This means that subsequent requests for prohibited content would not have to be passed through another mesh device or to the cloud security service center 230. Instead, prohibited content could be blocked immediately. Alternatively, content identified as being allowed could be accessed without sending subsequent requests for the same content to cloud security service center 230. In certain instances, computer 200 may also store a list of websites or web data that should be blocked and an application program operational at computer 200 may prevent other processes executing at computer 200 from sending requests for prohibited content based on the list of websites or web data that should be blocked. FIG. 2 illustrates that each mesh node 240, 250, and 260 along a communication pathway may store information that identifies whether a request for content is a request for good content or for bad content in respective cache memories 245, 255, and 265. As such, each mesh node 240, 250, or 260 that receives a request to access content that is identified as being bad content may block the request from being processed further.

Figure 3:
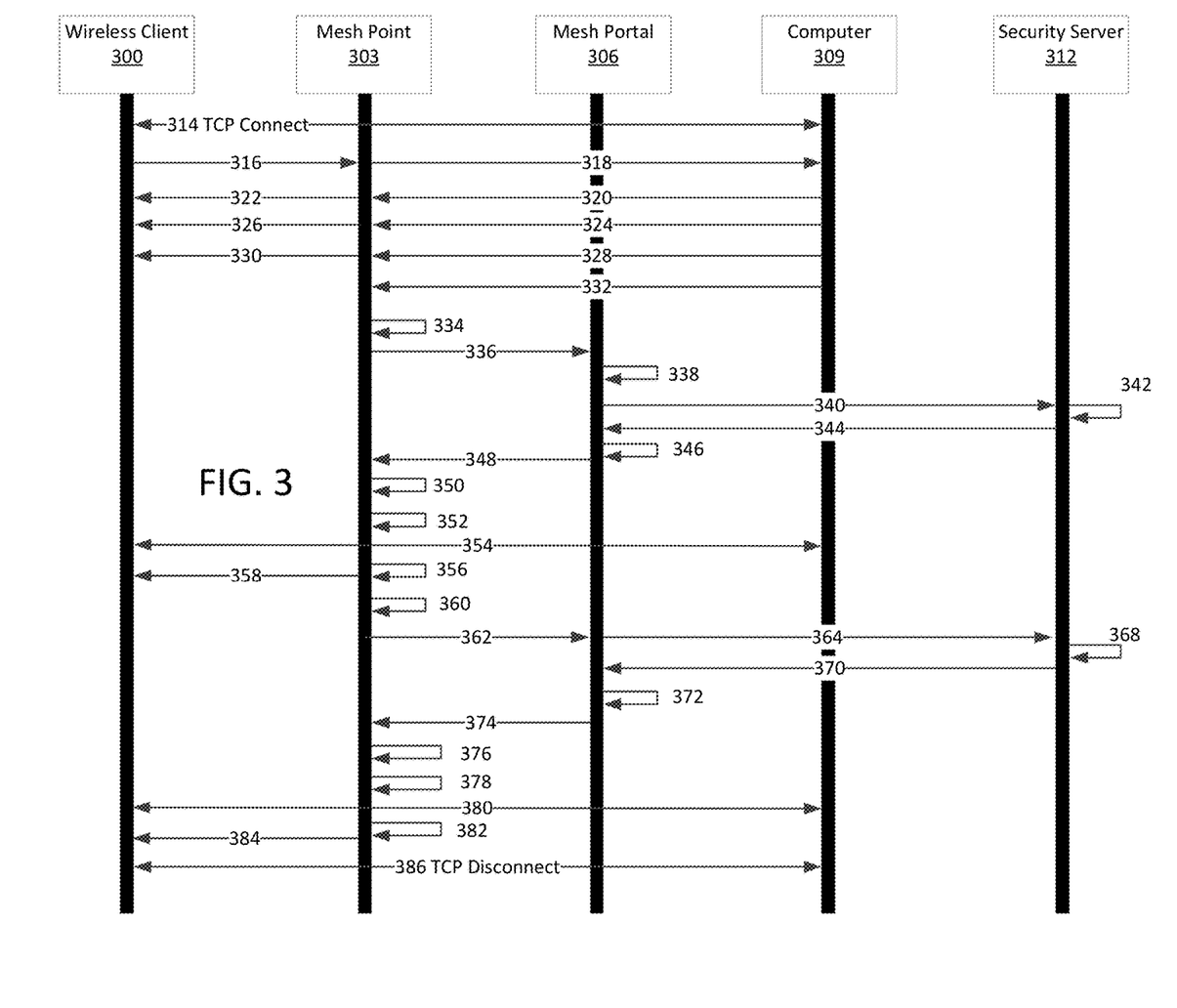
FIG. 3 illustrates a series of steps that may be performed when security functions are performed by individual wireless mesh nodes and by a server that provides a security service that protects a wireless mesh network.

FIG. 3 illustrates a series of steps that may be performed when security functions are performed by individual wireless mesh nodes and by a server that provides a security service that protects a wireless mesh network. FIG. 3 begins with a first step 314 where wireless client device 300 makes a transfer control protocol (TCP) connection with computer 309 that may be accessed via the cloud or Internet. Next in communication 316 of FIG. 3, wireless client 300 may send a request for content (e.g. file data, email, website content, audio data, or video data) to mesh point 303 and mesh point 303 may pass that request through mesh portal 318 to computer 309 using communication 318. Computer 309 may then send several different sets of information to wireless client 300 through mesh portal 306 and mesh point 303 as indicated by communication sets 320/322, 324/326, & 328/330. Communication set 320 & 322 may provide wireless client 300 with data that includes header information. This header information may identify a length associated with transferring requested content. Communication sets 324/326 and 324/326 may include different portions of the requested content. Next in communication 332, mesh point 303 may receive a final portion of the requested content and hold this final portion of the requested content until a final determination regarding the content request has been made. Mesh point 303 may then generate a signature from the received data and compare that signature with signatures stored in a cache memory at mesh point 303 during process 334 of FIG. 3. Process 334 may include assembling the different portions of the requested content before generating the signature or may generate the signature as different portions of the requested data are received. Signatures may be generated by performing a hash on the received data, a portion of received data, or using information that identifies content or a content source. Alternatively or additionally, mesh point 303 may analyze the received data to see if that data contains malware or other undesirable content by performing a deep packet inspection (DPI) of the received data, for example. As such, process 334 of FIG. 3 may perform one or more tests on the received data it includes a known set of malware or other undesired content.

In an a instance when the comparison of the signature with the set of signatures stored in the cache memory at mesh point 303 does not result in a bad or good result, mesh point 303 may send the signature to mesh portal 306 in step 336 and mesh portal 306 may then compare the signature to data stored in a cache memory local to mesh portal 306 in step 338. In an instance, when the signature does not match data stored in the cache memory of mesh portal 306, mesh portal 306 may forward the signature to security server 312 via communication 340. Security server 312 may then compare the signature with signatures stored at security server 312 during process 342, and security server 342 may return that result to mesh portal 306 in communication 344 of FIG. 3. Mesh portal 306 may then examine the result included in communication 344 during process 346 to see if security server 312 has identified that the signature is associated with undesired content or not. When result 344 indicates the signature includes undesired content, mesh portal 306 may store the signature in its cache memory during process 346 and may then forward the bad result to mesh point 303 in communication 348. In instances when data in the cache memory of mesh portal 306 matches the signature, mesh portal 306 may send a result to mesh point 303 without sending communication 340 to security server 312.

In an instance when mesh point 303, mesh portal 306, and security server 312 each identify that the signature does not match any known bad signature, communication 348 may include a good test result and mesh point 303 may store this good test result it its local cache memory. In instances when communication 348 includes a bad result, process 350 at mesh point 303 may store the signature in the cache memory of mesh point 303. Mesh point 303 may initiate process 352 that causes the TCP connection between wireless client 300 and computer 309 to be disconnected using communications 354. The process used to cause the TCP connection to be disconnected may include mesh point 303 sending a message to wireless client 300. Alternatively, when the result indicates that the signature does not match signatures of known bad content, process 356 at mesh point 356 may prepare to send the last portion of the requested content to wireless client 300 and the last portion of the requested content may be sent to wireless client 300 in communication 358.

In yet other instances, for example, the cache memory at mesh portal 306 or the cache memory of mesh point 303 also store known good signatures. In certain instances, a test message that includes a test result may identify a good test result, a bad test result, or an indeterminate test result. Mesh point 303, mesh portal 306, and security server 312 may maintain sets of known bad and sets of known good signatures that can be used to test access requests. When a test result is indeterminate, the reassembled content or a pointer to the reassembled content may be prepared in process 360 and that content or pointer may be sent to security server 312 using communications 362 and 364. Note that communications 362 passes from mesh point 303 to mesh portal 306, and communication 364 passes to from mesh portal 364 to security server 312. After receiving information included in communication 364, security server 312 may perform tests on the content during process 342 of FIG. 3. Tests that may be performed by security server 312 on the content may include comparing generated signatures with signatures that identify known bad or known good content, performing a DPI scan on content associated with the request, or may include run-time testing at an isolated computing device. Such isolated devices are commonly referred to as a sandbox computers and sandbox computers are known to be used to allow any program code included in received content to execute when execution of that program code is observed to see if program code performs suspicious activity. Such suspicious activity may include actions that do not conform to a set of rules or actions that are not characteristic of a type of content. Alternatively or additionally, tests performed by security server 312 during process 368 may include checking to see if the content includes offensive or inappropriate information, such as X-Rated materials, swear words, or material that is classified as spam.

After security server 312 performs one or more tests in process 368, a test result may be passed back to mesh portal 306. Mesh portal 306 may then examine this test result during process 372 to see if the test result is a good test result or a bad test result. When this test result is a bad result, process 372 may store the signature in the local cache memory of mesh portal 306 with a set of known bad signatures. Alternatively, when this test result is a good result, process 372 may store the signature in the local cache memory of mesh portal 306 with the set of known good signatures. The test result may then be passed to mesh point 303 in step 374 and mesh point 303 may examine this result during process 376 that may cause mesh point 303 to store that test result in its local cache memory during process 376. Process 378 may then identify whether the test result is a good test result or a bad test result. When process 378 identifies that the test result received in step 374 is a bad test result, the TCP connection formed in step 314 may be disconnected in step 380 of FIG. 3. When process 378 identifies that the test result received in step 374 is a good result, a final portion of the requested content may be prepared for transmission in step 382 and the final portion of the requested content may be sent to wireless client 300 in step 384 of FIG. 3. Sometime after wireless client 300 receives the last portion of the requested content, the TCP connection between wireless client 300 and computer 309 may be disconnected in step 386 of FIG. 3.

The various steps illustrated in FIG. 3 allows both mesh point 303 and mesh portal 306 that passed received a request for content and that received an indication that the content was bad or good can store data in a local cache memory that identifies whether the request is a good or a bad request. In certain instances, the steps and processes discussed in respect to FIG. 3 may be implemented by the apparatus discussed in respect to FIG. 1 or 2.

Figure 4:
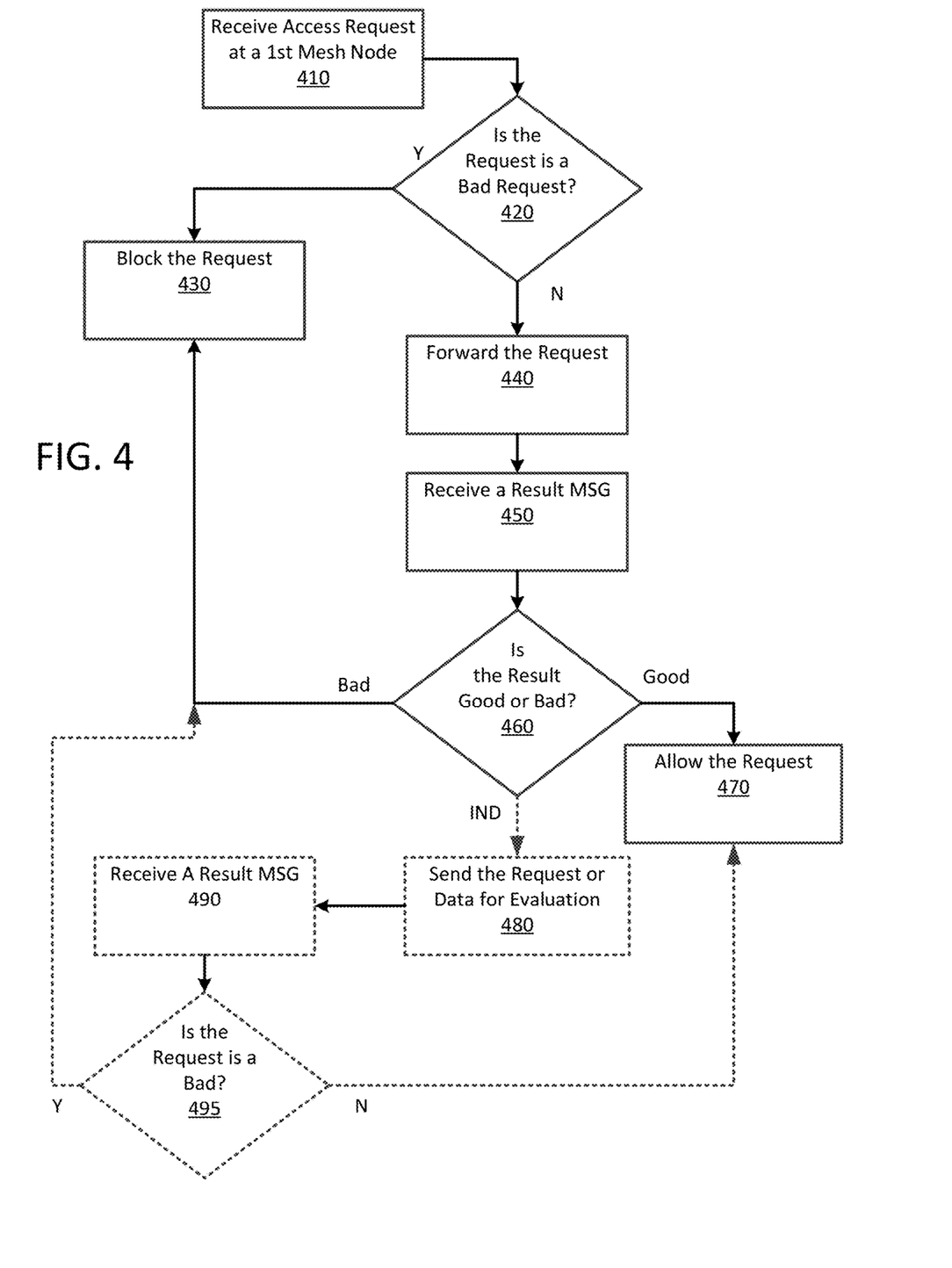
FIG. 4 illustrates a series of steps that may be performed by one or more mesh nodes consistent with the present disclosure when a request to access data is processed.

FIG. 4 illustrates a series of steps that may be performed by one or more mesh nodes consistent with the present disclosure when a request to access data is processed. In step 410 a request to access data is received, this request could have been received directly from a client device, such as wireless client 300 of FIG. 3, computing device 200 of FIG. 2, or one of computing devices 100A-C of FIG. 1. Alternatively, the request could have been received from a client device by a mesh point that forwarded the request to the mesh node. Next, determination step 420 of FIG. 4 may identify whether the request is a request for known bad data or is a request that is directed toward a known bad data source. A processor at the first mesh node may identify that the request is a bad request by accessing a cache memory local to the first mesh node. In such an instance, the cache memory at the first mesh node may store information that identifies that the requested data is a bad request based on a universal resource locator (URL) associated with the request, based on a domain name, a signature, or based on an identifier that identifies that a particular website has been assigned a bad reputation. While not illustrated in FIG. 4, step 420 may also identify whether the request is a known good request by evaluating information stored in the local cache memory of the first wireless mesh node. When determination step identifies that the received request is a bad request, program flow may move to step 430, where the request is blocked. The blocking of the access request may cause the first mesh node to send the client device that initiated that access request a message identifying that the request was blocked.

When determination step 420 identifies that the request does not appear to be a bad request, the request may be forwarded to a second mesh node in step 440 of FIG. 4 or to a security server. Next in step 450, a result message may be received from the second mesh node or the security server. When the result is received from a second mesh node, the second mesh node may have identified whether the request is a request for a known good or a known bad request based on data stored in a cache memory local to the second mesh node. Next, determination step 460 may identify whether the result is good or bad by parsing information included in the result message. In certain instances determination step 460 may identify that the result message identifies that the access request has an indeterminate status. This may mean that cache memories at the first or the second mesh node do not currently store information that identify whether a particular set of requested data is good or bad. When the result message indicates that the access request is bad, program flow may move to step 430, where the access request is blocked. When the result message indicates that the access request is good, program flow may move from step 460 to step 470 where the request is allowed.

When determination step 460 identifies that the result message includes the indeterminate status, the access request may be sent to a security server in step 480, after which a result may be received from the security server in step 490, and then determination step 495 may identify whether the request is a bad request. When determination step 495 identifies that the result received from the security server indicates that the request is a bad request, program flow may move to step 430 where the request is blocked. When determination step 495 identifies that the result received from the security server indicates that the request is not bad, program flow may move to step 470 where the request is allowed.

Steps 480, 490, and 495 of FIG. 4 each include dashed lines, these dashed lines indicate that step 480, 490, and 495 may be executed by the first mesh node or by another mesh node. In certain instances, the first mesh node may store data associated with the access request until the first mesh node receives indications from other mesh nodes in a path at a wireless mesh network have not been able to classify the access request as being either a good or a bad access request. In such an instance, the first mesh node may send data received from a data source (such as computer 309 of FIG. 3) to the security server, where the security server may test the data to see if that data should be classified as either good or bad. Alternatively, the first mesh point may send the request to a security server such that the security server can access the data or evaluate identifiers associated with the request to see if the request is a good or a bad request. In other instances, steps 480, 490, and 495 may be performed by another mesh node that sends the request or data associated with the request to the security server for evaluation. As such, the steps illustrated in FIG. 4 may be performed by a single mesh node or may be performed by a more than one mesh node of a wireless mesh network. In an instance, where the first wireless mesh node is a mesh portal, steps 440, 450, and 460 of FIG. 4 may be eliminated as there may be no other mesh node to forward the access request to.

The forwarding of the request in step 440 or the sending of the request in step 480 may include sending information associated with or generated from an original access request. As such, steps 440 or 480 may include sending signature data, a URL, a domain name, or other information that may identify data or a data source. While not illustrated in FIG. 4, the security computer after receiving the access request may access a database to look up a rating associated with a website or with requested content. In an instance where no rating relating to the request is stored in the database, the security computer may access other databases that store rating information. Alternatively or additionally, the security computer could perform a series of tests on data retrieved from the website or computer. These tests could include, for example, deep packet inspection, anti-virus scans, or run-time-tests. In certain instances, a run-timer-test performed at a security computer may include interpreting or manipulating the received data as the security computer looks for suspicious or malicious activity performed by data received from the website or computer associated with the request. As such, the security computer may perform functions of checking to see whether requests are associated with computers that already are associated with a bad reputation or the security computer may perform more advanced analysis that could be performed by a firewall or a computer that evaluates computer data in a secure environment that is commonly referred to as a "sandbox." "Sandboxes" are computers that have the capability to access data, open files, or execute program code before that data, files, or program code can be accessed by a requesting computer. In the event that data, files, or program code received by the sandbox computer performs a suspicious or malicious act, the sandbox computer can be used to identify that the data, files, or program code should be assigned a bad rating before a requesting computer can be exploited or damaged by the suspicious or malicious act. As such, the security computer may be used to identify a reputation associated with an access request by various means. In certain instances, various actions such as reputation look up, deep packet inspection, or sandboxing tests may be performed at one or more computing devices optimized to perform one or more particular security functions.

The rating may be stored in a manner that cross-references the rating with a URL or other information that identifies requested data, a requested file, a domain, or information that identifies a computer associated with a particular request. As reviewed above, the first wireless mesh node may then send (forward) the response with the rating to a second wireless mesh node. This second wireless mesh node may also store the rating in its own cache. The rating may be stored in each respective cache of each respective mesh node that passes information relating to the request back to the computer that originally made the request. This method improves the efficiency of a wireless network because no additional message traffic may be required to share cache information between different mesh nodes along a path that traverses multiple mesh nodes.

Figure 5:
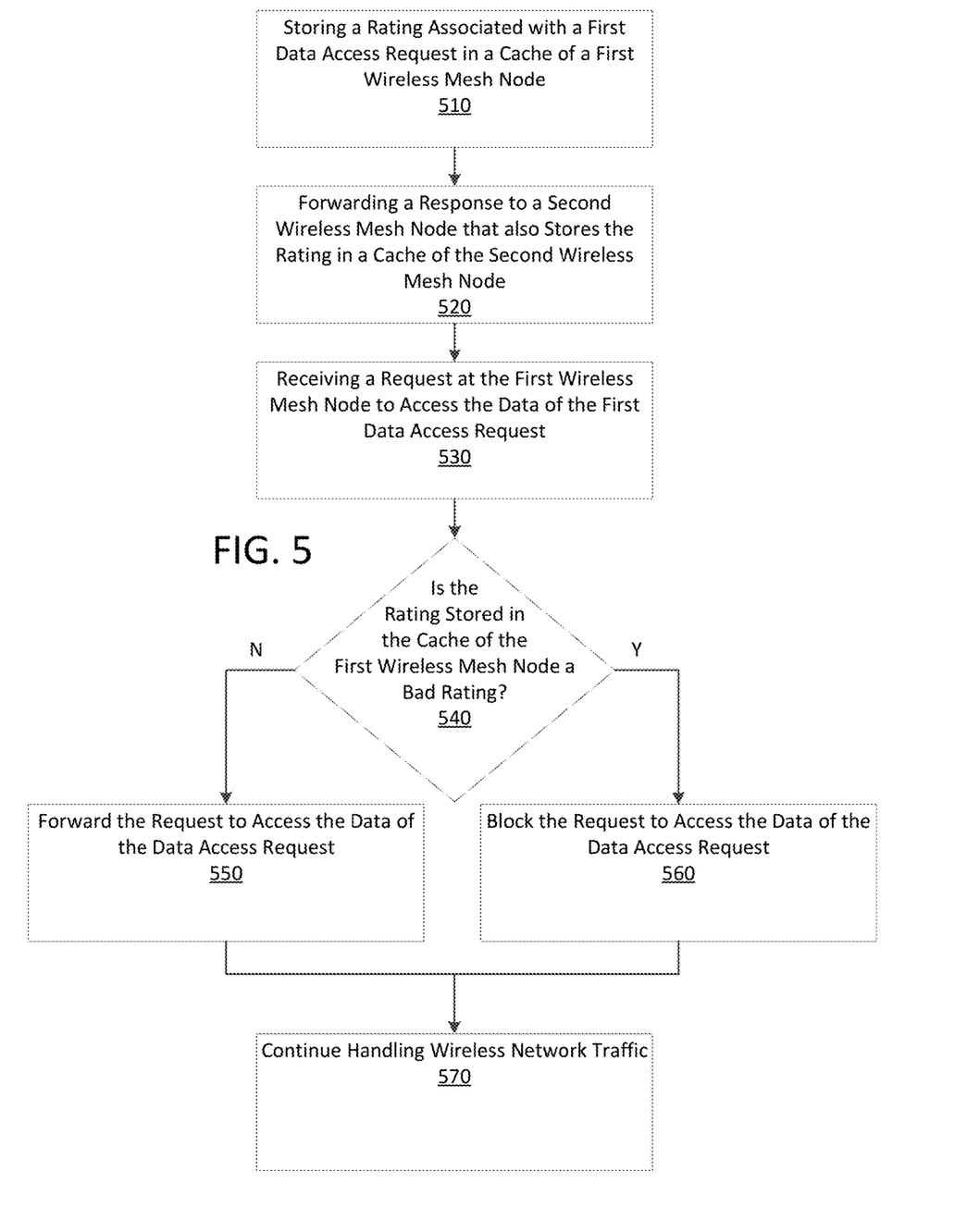
FIG. 5 illustrates a series of steps where any mesh node in a set of mesh nodes share the work of identifying whether a request for computer data is associated with a known rating or reputation.

FIG. 5 illustrates a series of steps where any mesh node in a set of mesh nodes share the work of identifying whether a request for computer data is associated with a known rating or reputation. FIG. 5 begins with step 510 where a rating associated with a first data access request is stored in a cache of a first wireless mesh node. The rating stored in step 510 may have been included in a response message associated with the first data access request. Note that the response message may traverse a same set of mesh nodes that a first data access request traversed. As such, a first computing device may have sent the first request to the second wireless access node, the second wireless access node may have forwarded that request to the first wireless access node, the first wireless access node may have forwarded that request to a security computer, and the security computer may have sent the response to the first wireless access node.

Next in step 520, the first wireless mesh node may forward the response to the second wireless mesh node that may also store the rating in a cache memory local to the second wireless mesh node. Next, the first wireless mesh node may receive a second request in step 530 of FIG. 5. Note that this second request may have been received directly from a requesting device without that request being passed through another mesh node. Determination step 540 may be performed by a processor at the first wireless mesh node that checks to see whether the requested data is associated with a bad rating stored in the cache of the first wireless mesh node. In the instance when the request is found to be associated with a bad rating or reputation, the processor at the first wireless mesh node may then prevent (block) the second request from being sent to another computing device in step 560 of FIG. 5. The first wireless mesh node may then inform the computer that sent the second request that the request was blocked due to the fact that the requested data is associated with the bad rating or reputation.

Note that the second request could have been for the same data that was requested in the first request and that each of the mesh nodes that passed the response associated with the first request response should have stored the rating in a respective cache memory. Because of this, any of the mesh nodes that passed the response can identify ratings associated with subsequent requests for the same data and block those subsequent requests without passing a subsequent request to another computing device. As such, the caching of rating information at different respective mesh nodes according to the present disclosure can reduce traffic in a wireless mesh network as part of a load balancing function that may be implemented by any of mesh nodes of FIGS. 1-3.

When determination step 540 identifies that the request is not associated with a bad reputation, the request may be sent to other computing devices. Here again the request could be passed to a security computer for evaluation. Alternatively, a processor at the first mesh node may identify that the requested data is associated with a good reputation and the request message could be passed to a computer that provides the requested data. In such an instance, data included in the request message may be modified to include information that informs other mesh nodes or a firewall that the request is associated with a data source that has a good reputation. Because of this methods consistent with the present disclosure may also prevent security computers from receiving excessive communication traffic and from performing security tasks redundantly. In such an instance subsequent requests for good data may be sent to an external computer without sending that subsequent request to the security computer. After step 550 or step 560 of FIG. 5, program flow may move to step 570, where the first wireless access node continues handling network traffic.

Figure 6:
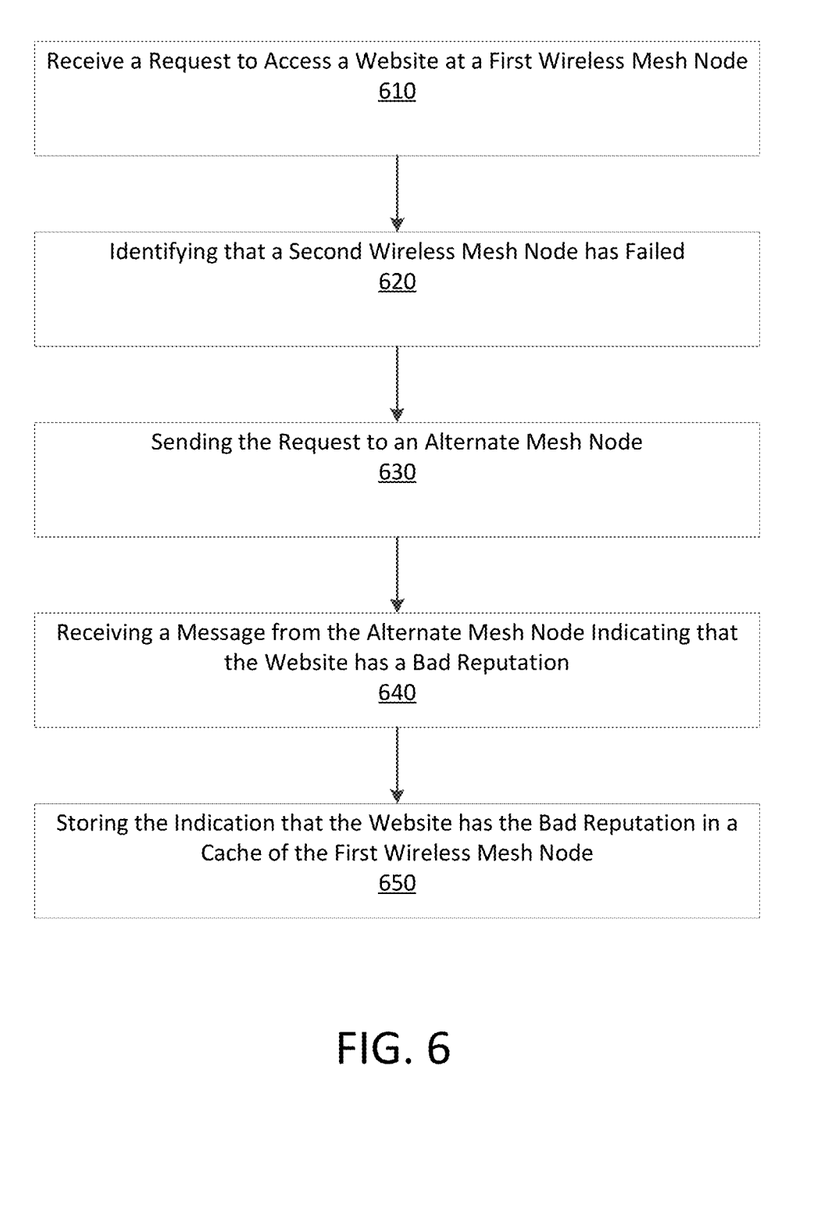
FIG. 6 illustrates a series of steps that may be performed at a mesh node when another mesh node in a set of mesh nodes has failed.

FIG. 6 illustrates a series of steps that may be performed at a mesh node when another mesh node in a set of mesh nodes has failed. Step 610 of FIG. 6 is a step where a request to access a website is received at a first wireless mesh node. Next the first wireless mesh node may identify that a second wireless mesh node has failed in step 620. The first wireless mesh node may then send the request to an alternate mesh node in step 630 of FIG. 3. After step 630, the first wireless mesh node may receive a message from the alternate mesh node in step 640 of FIG. 6 that indicates that the request is associated with a bad reputation. At the time the first mesh node received this message, a cache memory at the first wireless mesh node may not store information regarding a rating or reputation of the website access request of step 610 of FIG. 6. At this time, however, a cache memory of the alternate mesh node may store information that identifies a rating or reputation associated with the website access request. In an instance when the alternate mesh node identifies that the rating stored in its cache indicates that the website is associated with a bad reputation, the alternate mesh node machine may block the access request and may send a message back to the first mesh node that identifies that the access request was based on the bad reputation. Next, the message sent from the alternate mesh node may be received at the first mesh node in step 640 and the first mesh node may store an indication of the bad reputation in a cache memory of the first mesh node in step 650 of FIG. 6. While not illustrated in FIG. 6, the first wireless mesh node may then send a message back to a computer that originally sent the access request of step 610.

The steps of FIG. 6 illustrate that all caches of all mesh nodes in a large wireless mesh network may not store identical information. For example, the first mesh node may not have been a mesh node that previously forwarded an access request that identified the website requested in step 610. In such an instance, a previous request to access this same website may have been passed through a plurality of different mesh nodes that include the alternate mesh node. Furthermore, cache memories of each of those different mesh nodes may store information identifying the bad reputation of the website requested in step 610 of FIG. 1.

In certain instances, an application program executed by a computing device may also store reputation information of data accessible (e.g. websites, files, computer name/address, or domains) via a computer network. For example, a user computing device may store data that identifies previous requests made by the user computing device to access links associated with a bad reputation. Program code operational at this computing device could block any access request from the computing device without having to send that request to a wireless access point. Such a set of program code at the mobile device could reduce a number of communications passing to or through the wireless network by preventing bad access requests from being redundantly sent from a computing device.

In an instance when the computing device is mobile device is moved from one physical location to another in a wireless mesh network at a primary location (e.g. at the San Francisco Office) or at a another physical location (e.g. at the Los Angeles Office), requests from the mobile device may pass through different sets of wireless mesh nodes depending on a number of factors that include relative device locations, relative signal strengths, or an operational status of devices in a wireless mesh network. A redundant request sent from the mobile device to a website with a bad reputation if sent from the mobile device may traverse multiple hops in the wireless mesh network before an indication of the bad reputation were passed back to the mobile device. Program code operational at a mobile device may not only prevent such redundant requests for the same bad content from being sent from the mobile device as this program code could identify how many times the mobile device attempted to request the bad content. This program code could also be configured to provide a warning message to a user or may be configured to send messages regarding these redundant requests to a system administrator. For example a message may be sent to an administrator when more than a threshold number of redundant requests for bad data are sent from a mobile device. In such an instance, the user administrator may identify that this mobile device may have been compromised by malware and that device could then be quarantined from a network. This quarantining may include blocking that computer from accessing the network until that particular mobile device was scanned for viruses or otherwise analyzed.

Figure 7:
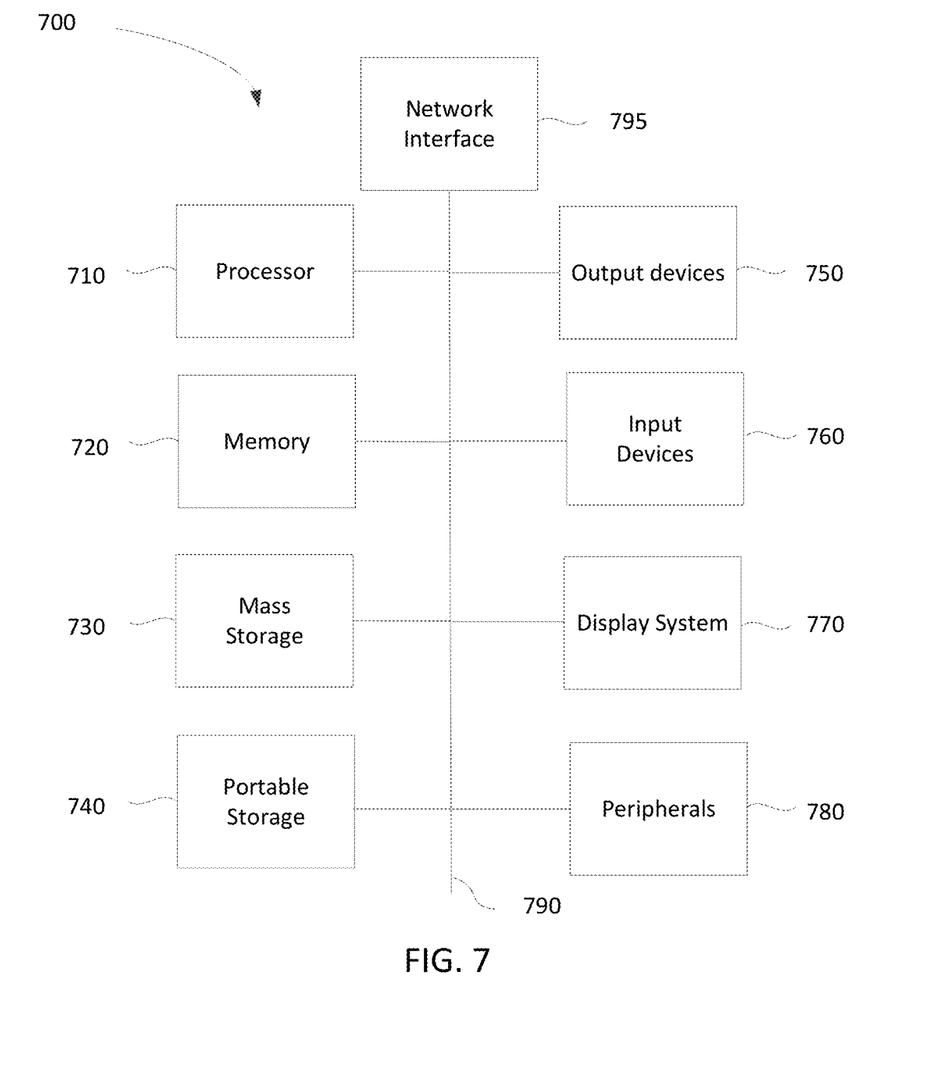
FIG. 7 illustrates a computing system that may be used to implement an embodiment of the present invention.

FIG. 7 illustrates a computing system that may be used to implement an embodiment of the present invention. The computing system 700 of FIG. 7 includes one or more processors 710 and main memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, peripheral devices 780, and network interface 795.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a FLASH memory, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem or a router.

Network interface 795 may include any form of computer interface of a computer, whether that be a wired network or a wireless interface. As such, network interface 795 may be an Ethernet network interface, a BlueTooth™ wireless interface, an 802.11 interface, or a cellular phone interface.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 700 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for preventing access to undesired content, the method comprising:

receiving a request to access content at a first wireless mesh node, the request identifying a content source device;

comparing information associated with the request with information stored in a cache memory of the first wireless mesh node;

sending the information associated with the request to a first computing device, wherein the first computing device compares the information associated with the request with stored information and provides a test result to the first wireless mesh node that indicates at least one of a good, bad, or indeterminate status of the access request;

establishing a communication session between the first wireless mesh node and the content source device identified by the request;

sending an initial portion of the requested content to a requesting computer in accordance with the received request, wherein a final portion of the requested content is held at the first wireless mesh node pending receipt of the test result from the first computing device; and performing an action based on the received test result, wherein the action performed includes at least one of allowing the final portion of the requested content to be sent to the requesting computer when the received test result is indicative of a good access request, blocking the final portion of the requested content from being sent to the requesting computer when the received test result is indicative of a bad access request, or sending data regarding the request to a security computer when the result is indicative of an indeterminate status.

2. The method of claim 1, wherein:

the information associated with the request is sent from the first computing device to a second computing device after the first computing device identifies that data stored in a cache memory local to the first computing device is not indicative of either a good access request or a bad access request, and the second computing device performs one or more tests based on the information associated with the request and provides the test result to the first wireless mesh node via the first computing device.

3. The method of claim 1, further comprising sending content associated with the request to a security computer, wherein the security computer performs one or more evaluations that identify a test result and the test result is provided to the first wireless mesh node by the security computer via the first computing device.

4. The method of claim 1, further comprising generating a signature that creates the information associated with the request.

5. The method of claim 1, wherein the communication session is a transfer control protocol (TCP) communication session.

6. The method of claim 5, further comprising
dropping the TCP communication session when the test result is indicative of a bad access request.

7. The method of claim 1, further comprising sending a pointer to the requested content associated with the request to a security computer, wherein the security computer accesses the content and performs one or more evaluations that identify the test result and the test result is provided to the first wireless mesh node by the security computer via the first computing device.

8. A non-transitory computer-readable storage medium having embodied thereon a program executable by a processor for implementing a method for preventing access to undesired content, the method comprising:

receiving a request to access content at a first wireless mesh node, the request identifying a content source device;

comparing information associated with the request with information stored in a cache memory of the first wireless mesh node;

sending the information associated with the request to a first computing device, wherein the first computing device compares the information associated with the request with stored information and provides a test result to the first wireless mesh node that indicates at least one of a good, bad, or indeterminate status of the access request;

establishing a communication session between the first wireless mesh node and the content source device identified by the request;

sending an initial portion of the requested content to a requesting computer in accordance with the received request, wherein a final portion of the requested content is held at the first wireless mesh node pending receipt of the test result from the first computing device; and performing an action based on the received test result, wherein the action performed includes at least one of allowing the final portion of the requested content to be sent to the requesting computer when the received test result is indicative of a good access request, blocking the final portion of the requested content from being sent to the requesting computer when the received test result is indicative of a bad access request, or sending data regarding the request to a security computer when the result is indicative of an indeterminate status.

9. The non-transitory computer-readable storage medium of claim 8, wherein:

the information associated with the request is sent from the first computing device to a second computing device after the first computing device identifies that data stored in a cache memory local to the first computing device is not indicative of either a good access request or a bad access request, and the second computing device performs one or more tests based on the information associated with the request and provides the test result to the first wireless mesh node via the first computing device.

10. The non-transitory computer-readable storage medium of claim 9, further comprising sending content associated with the request to a security computer, wherein the security computer performs one or more evaluations that identify a test result and the test result is provided to the first wireless mesh node by the security computer via the first computing device.

11. The non-transitory computer-readable storage medium of claim 9, the program further executable to generate a signature that creates the information associated with the request.

12. The non-transitory computer-readable storage medium of claim 9, wherein the communication session is a transfer control protocol (TCP) communication session.

13. The non-transitory computer-readable storage medium of claim 12, the program further executable to drop the TCP communication session when the test result is indicative of a bad access request.

14. The non-transitory computer-readable storage medium of claim 9, the program further executable to send a pointer to the requested content associated with the request to a security computer, wherein the security computer accesses the content and performs one or more evaluations that identify the test result and the test result is provided to the first wireless mesh node by the security computer via the first computing device.

15. An apparatus for preventing access to undesired content, the apparatus comprising:

a wireless data communication interface that receives a request to access content, the request identifying a content source device;

a memory;
a cache memory; and
a processor that executes instructions out of the memory to:
- compare information associated with the request with information stored in the cache memory,
- prepare the information associated with the request for transmission to a first computing device, wherein the information associated with the request is transmitted to the first computing device, and the first computing device:
  - compares the information associated with the request with stored information,
  - provides a test result to the wireless data communication interface that indicates at least one of a good, bad, or indeterminate status of the access request,
  - establishes a communication session between the wireless data communication interface and the content source device identified by the request, and
  - sends an initial portion of the requested content to a requesting computer in accordance with the received request, wherein a final portion of the requested content is held pending receipt of the test result from the first computing device; and
- perform an action based on the received test result, wherein the action performed includes at least one of allowing the final portion of the requested content to be sent to the requesting computer when the received test result is indicative of a good access request, blocking the final portion of the requested content from being sent to the requesting computer when the received test result is indicative of a bad access request, or sending data regarding the request to a security computer when the result is indicative of an indeterminate status.

16. The apparatus of claim 15, wherein:
the information associated with the request is sent from the first computing device to a second computing device after the first computing device identifies that data stored in a cache memory local to the first computing device is not indicative of either a good access request or a bad access request, and
the second computing device performs one or more tests based on the information associated with the request and provides the test result to the wireless communication interface via the first computing device.

17. The apparatus of claim 15, wherein:
the processor prepares content associated with the request to be sent to a security computer, and
the security computer receives the prepared content, performs one or more evaluations that identify a test result, and provides the test result to the wireless communication interface.

18. The apparatus of claim 15, wherein the processor also executes instructions out of the memory to generate a signature that creates the information associated with the request.

19. The apparatus of claim 15, further comprising a second wireless data communication interface that transmits the information associated with the request to the first computing device.

20. The apparatus of claim 15, further comprising a second communication interface that transmits the information associated with the request to the first computing device, wherein the wireless communication interface is a first type of communication interface that is compatible with a first wireless standard and the second communication interface is a second type of communication interface that is different from the first type of communication interface.

* * * * *